United States Patent [19]

Benteler et al.

[11] Patent Number: 4,563,802

[45] Date of Patent: Jan. 14, 1986

[54] METHOD AND APPARATUS FOR THE PRODUCTION OF EXHAUST PIPES FOR AUTOMOTIVE VEHICLES

[75] Inventors: Hubertus Benteler, Bielefeld; Egon Olszewski, Paderborn-Elsen, both of Fed. Rep. of Germany

[73] Assignee: Benteler-Werke AG, Paderborn, Fed. Rep. of Germany

[21] Appl. No.: 147,255

[22] Filed: May 6, 1980

[30] Foreign Application Priority Data

Jul. 12, 1979 [DE] Fed. Rep. of Germany ....... 2928120

[51] Int. Cl.$^4$ ...................... B23K 31/06; B21D 7/024
[52] U.S. Cl. .................................... 29/157 R; 72/294; 72/307; 72/422; 72/34; 228/147; 228/155; 414/748
[58] Field of Search ................ 29/157 R; 72/294, 306, 72/307, 14, 15, 422, 34; 228/147, 155; 414/748, 745

[56] References Cited

U.S. PATENT DOCUMENTS

| | | | |
|---|---|---|---|
| 1,726,347 | 8/1929 | Gross et al. | 228/155 |
| 2,581,673 | 1/1952 | Kennedy | 228/147 |
| 3,076,562 | 2/1963 | Pitts | 414/745 |
| 3,122,114 | 2/1964 | Kringel et al. | 29/430 |
| 3,357,087 | 12/1967 | Barnikel et al. | 228/147 |
| 3,845,540 | 11/1974 | Rossi et al. | 228/147 |
| 4,102,173 | 7/1978 | Saloom | 72/306 |
| 4,142,394 | 3/1979 | Damman | 72/15 |
| 4,193,486 | 3/1980 | Borzym et al. | 414/748 |
| 4,232,813 | 11/1980 | Eaton | 228/147 |

*Primary Examiner*—Daniel C. Crane
*Attorney, Agent, or Firm*—Michael J. Striker

[57] ABSTRACT

A method for the continuous production of exhaust pipes for automotive vehicles comprises the steps of continuously withdrawing an elongated substantially flat metal strip from a coil and subsequently bending and forming the moving strip into a longitudinally slitted tube strand. The opposite faces of the slitted pipe strand are then welded together and subsequently the pipe strand, while still moving, is severed into pipe sections of predetermined length and the pipe sections are then transferred to at least one bending apparatus for bending the pipe sections into exhaust pipes with predetermined bends; and an apparatus for carrying out the above method.

4 Claims, 5 Drawing Figures

METHOD AND APPARATUS FOR THE PRODUCTION OF EXHAUST PIPES FOR AUTOMOTIVE VEHICLES

BACKGROUND OF THE INVENTION

The present invention relates to a method for the production of exhaust pipes for automotive vehicles in which pipe sections of predetermined length are transferred to a bending apparatus to be bent in the latter and wherein preferably the dimensions of the free end of the bent pipe are gauged to see whether they correspond to the desired dimensions.

The present invention is likewise directed to an apparatus for carrying out the above-mentioned method.

Up to now such exhaust pipes have been produced in a non-continuous manner. According to a known method straight tube sections of predetermined length have been cut from a premanufactured elongated pipe strand and these cut tube sections have been usually placed onto a magazine to be taken from there depending on the desired delivery term and transported to one or a plurality of bending apparatus in which the tube sections have been finished bent to exhaust pipes. The exhaust pipes have subsequently thereto been checked as to exactness of their dimensions and then made ready for delivery.

One reason for such a separation in time and space of the severing of the pipe strand into pipe sections from the necessary bending operation is due to the fact that different automotive vehicles require exhaust pipes of different configuration. Therefore, the tube sections are necessarily of different length. This difficulty is then further increased if two differently bent exhaust pipes are to be welded together to a specific exhaust arrangement. Evidently, such a non-uniform work cycle is connected with uneconomical idle times, due to the taking out of the severed pipe sections from the production process, the intermediate placing of the severed pipe sections into magazines and the subsequent transfer of the severed pipe sections from the magazine into the new finishing process. Idle times lead however not only to higher manufacturing costs, but such idle times are in many cases also the cause of non-uniform quality of the finished exhaust pipes.

SUMMARY OF THE INVENTION

It is an object of the present invention to provide a method and apparatus for the continuous production of exhaust pipes for automotive vehicles in which uneconomical idle times, transport times and storing times are avoided and in which a uniformly high quality of the finished exhaust pipes is assured.

With these and other objects in view, the method according to the present invention for the continuous production of exhaust pipes for automotive vehicles mainly comprises the steps of bending and welding a continuous metal strip to an endless pipe strand while continuously moving the strand in axial direction with a predetermined speed, straightening the strand, stepwise severing said pipe strand into pipe sections of predetermined length while the strand continuously moves at said predetermined speed, and thereafter transferring the cut pipe sections into at least one bending apparatus for bending the pipe sections into exhaust pipes with predetermined bends.

The method preferably includes also the step of gauging one end of the bent pipe section while still held by the bending apparatus.

Preferably the cut pipe sections are alternately transferred into two bending apparatus located to opposite sides of a path along which the cut pipe sections are moved, wherein the two bending apparatus are differently adjusted so as to bend the pipe sections respectively transferred thereinto in a different manner.

The method according to the present invention permits therefore an interlinking in time and space of successive method steps for continuously forming exhaust pipes with predetermined bends from a substantially flat metal strip. Especially advantageous is thereby if, as mentioned above, two bending apparatus are provided located to opposite sides of the path along which the cut pipe sections are transported, so that a relatively high welding speed may be chosen. Thereby it is further advantageous that two pipe sections of different length may be simultaneously bent to exhaust pipes with different bends, which subsequently thereto may be connected to each other for a specific exhaust pipe arrangement.

The method according to the present invention assures a uniform progress of the manufacturing steps in that the production of the pipe sections are followed quickly by the bending operations. Uneconomical idle times, which for instance result from an interruption of the manufacturing steps, are avoided. In addition, the manufacturing steps which quickly follow each other assure also a uniform high quality of the produced exhaust pipes. This result is supported by the fact that the exhaust pipes are checked as to their dimensions while they are still clamped by the bending apparatus. Only after the proper dimensions are assured, a signal is transmitted to the bending apparatus which releases the finished bent exhaust pipes.

The apparatus according to the present invention mainly comprises means for continuously moving an endless metal strip with a predetermined speed along a predetermined path extending in the longitudinal direction of the strip, forming and welding means along the aforementioned path for continuously forming and welding the strip during the movement thereof with said predetermined speed, depending on the maximum obtainable welding speed, into a continuous pipe strand, severing means downstream of the forming and welding means for cutting the pipe strand into sections of predetermined length during continuous advance of said pipe strand, and bending means including an elongated mandrel for bending the successively produced pipe sections into exhaust pipes.

Preferably, the apparatus includes further control means coordinated with the bending means for gauging the dimensions at the end of the bent tube section while the latter is still held by the bending means.

The apparatus according to the present invention comprises therefore four finishing aggregates which cooperate together to produce finished exhaust pipes in a continuous process. In this way uneconomical idle times are avoided and at the same time a uniform high quality standard is assured. By the combination of the aforementioned four individual aggregates to a single apparatus it is therefore possible to produce even differently shaped exhaust pipes in uninterrupted sequence with uniform quality.

The severing means may comprise machining means or severing means producing substantially no chips.

In a preferred construction the severing means comprises a rotary saw blade mounted on the end of the output shaft of a drive motor and the latter is mounted on first guide means extending normal to the aforementioned path, whereas the first guide means are in turn mounted on second guide means extending parallel to this path. In this way, the drive motor for the saw blade may be moved parallel to the pipe strand with a speed which corresponds exactly to the advancing speed of the latter. The length of the pipe section cut from the pipe strand will therefore depend only on the advancing speed of the pipe strand and the distance at which the drive motor with the saw blade is moved back on the second guide means after severing a pipe section from the pipe strand.

According to the present invention it is also advantageous to provide between the severing device and the bending apparatus a roller bed extending in the axial direction of the pipe strand for the severed pipe sections. This roller bed is tiltable about its longitudinal axis and at least one lateral magazine is located to one side of the tiltable roller bed so that the severed pipe sections may be transferred during tilting of the roller bed to the aforementioned magazine. This magazine constitutes therefore a buffer station which permits to harmonize the pipe welding speed with the bending speed, including the necessary time for checking the dimension of the finished bent exhaust pipe, to thus avoid idle times and at the same time an oversupply of severed pipe sections. The tiltable roller bed permits also to transfer the severed pipe section to the left and the right sides of the roller bed, if for instance two bending apparatus are provided, in order to increase the output of the machine or to manufacture at the same time two differently shaped exhaust pipes which subsequently thereto are to be welded together to a single exhaust pipe arrangement.

The transfer of the pipe sections from one magazine to the bending apparatus coordinated therewith is preferably carried out by gripping and transfer means between the magazine and the bending apparatus for transferring the tube sections in the magazine from the latter to the bending apparatus coordinated therewith. The gripping and bending means are tiltable at least through an angle of 180~ about a horizontally extending axis, whereby the base of the bending and gripping means is also movable within limits parallel to the direction of movement of the pipe strand, in order to accommodate pipe sections of different lengths.

According to a further advantageous characteristic of the invention the control means for checking the dimensions of the finished bent tube comprise a gauging head including a plurality of feelers, adjusted according to the desired dimensions at the end of the bent tube section, and means mounting the gauging head tiltable about an axis extending transverse to the bent tube section and movable in a direction normal to the tilting axis, to align the gauging head with the free end portion of the bent tube section. In this way the gauging head may, after termination of the bending operation, only moved onto the end of the finished bent exhaust pipe. It has been ascertained that in most cases it is only necessary to check the end of the bent exhaust pipe since errors in the bending operation always take effect at that end. However, in certain cases it may be also advantageous, if according to the invention the exhaust pipe during the last bending process is bent into a stationarily arranged gauging head.

The invention provides also that the welding apparatus, the severing device and the bending apparatus are either individually or together stopped if the control means indicate that the actual values produced are located outside the permissible tolerances of the desired values for the finished exhaust pipe. In this way, it is possible to immediately correct, upon ascertaining a faulty product, the respective aggregate, whereafter the operation may be continued to assure a perfect sequence of operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
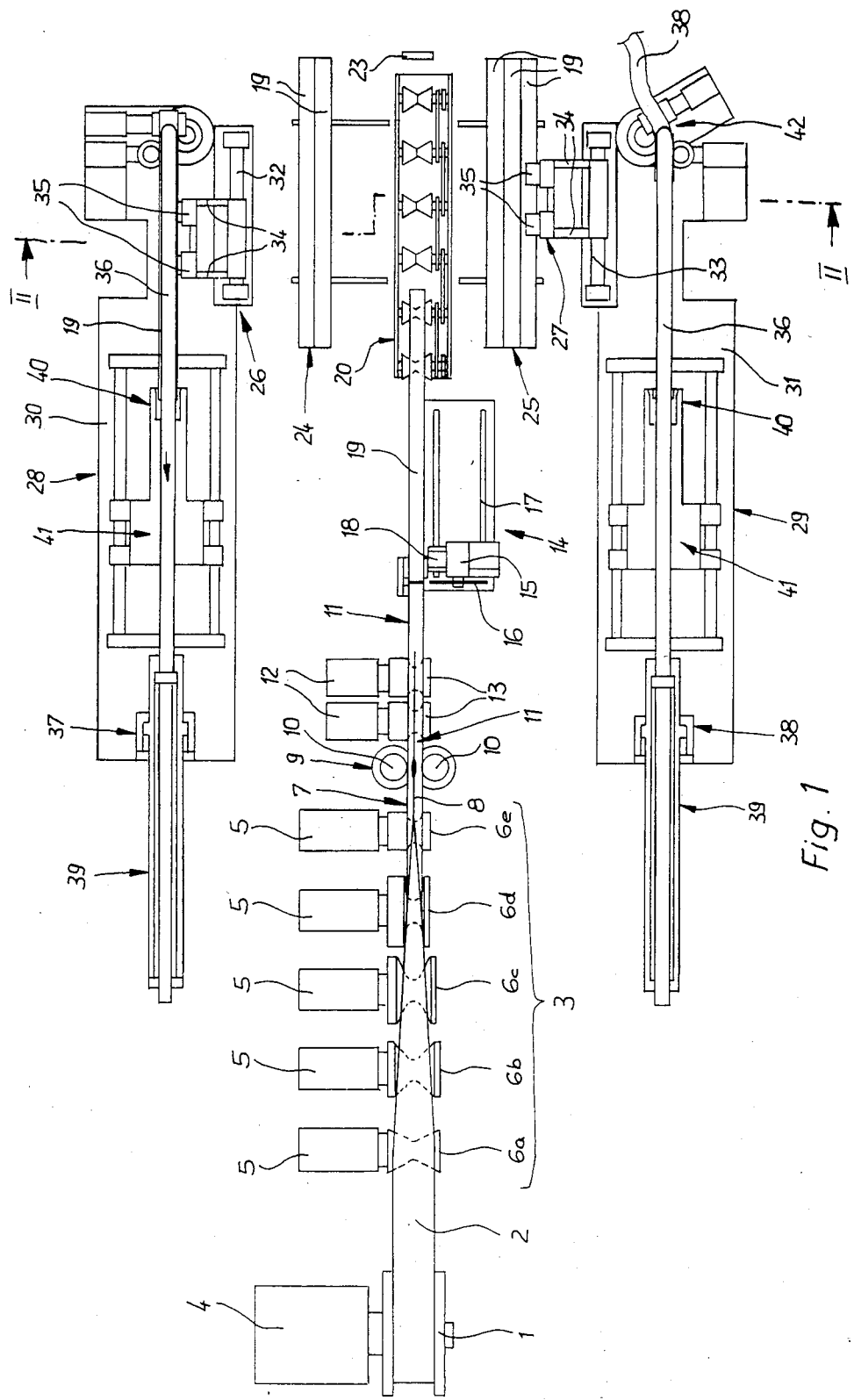
FIG. 1 is a schematic top view of the apparatus for the production of exhaust pipes for automotive vehicles.

Referring now to the drawing, and more specifically to FIG. 1 of the same, it will be seen that the apparatus according to the present invention for continuously producing exhaust pipes for automotive vehicles comprises a sheet metal strip wound into a coil 1 which is driven by an electromotor 4 to unwind the substantially flat sheet metal strip 2 from the coil. The sheet metal strip 2 is passed in longitudinal direction over a plurality of forming rolls 6a–6e, which are respectively driven by electromotors 5, to form the sheet metal strip 2 into a slitted pipe 7, the slit of which is welded together by a pipe welding apparatus 9 by means of resisting welding and comprising a pair of opposite welding rollers 10 of known construction.

The pipe strand 11 moving out of the welding apparatus 9 is subsequently thereto straightened by straightening rollers 13 which are driven by electromotors 12. Subsequently thereto the pipe strand 11 may be subjected to an ultrasonic test or provided with an outer layer for instance of aluminum, by known means not shown in the drawing.

Subsequently thereto, the pipes strand 11 is passed by a severing device 14. The severing device 14 comprises a rotary saw blade 16 mounted at the end of the output shaft of a drive motor 15, which in turn is mounted on a guide 18 extending normal to the longitudinal axis of the pipe strand 11 for movement in this direction. The guide 18, in turn, is mounted on a second guide 17 extending parallel to the direction of movement of the pipe strand 11. The motor 15 with the rotating saw blade 16 is movable along the guide 18 by known means not shown in the drawing, and the guide 18, in turn, is movable along the guide 17 by conventional means, not shown in the drawing, with a predetermined speed adjusted to the advancing speed of the pipe strand 11 so that in the direction of advancement of the pipe strand 11 the rotating saw blade will move with the same speed as the pipe strand 11.

Figure 2:
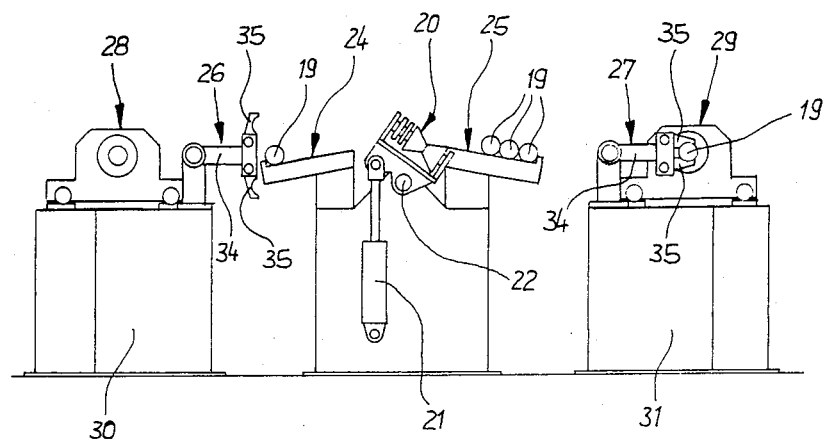
FIG. 2 is a vertical cross-section taken along the line II—II of FIG. 1, showing however the various elements in a different operating position than in FIG. 1.

The pipe sections 19, severed by the saw blade 16 from the pipe strand 11, move then onto a roller bed 20 extending in the longitudinal direction of the pipe strand 11 (see also FIG. 2). The roller bed 20 is tiltable about a tilting axis 22 extending in the direction of advancement of the pipe strand 11 by means of a hydraulically operated tilting unit 21. After the severed pipe section 19 engages a stop 23 at the end of the roller bed 20, the latter will be tilted, depending on the bending program, either towards the left or the right, to thereby transfer the pipe section 19 into a magazine 24 or 25, respectively located at opposite sides of the roller bed 20 and serving as a buffer between the welding operation and the subsequent bending operation to be described.

The pipe sections 19 in the magazines 24 and 25 are transferred to the bending apparatus 28 and 29, respectively adjacent thereto, by means of tiltable grippers or gripper and transfer means 26 and 27, which are respectively located between the respective magazine and the bending apparatus coordinated therewith. The gripping and transfer means 26, 27 are respectively mounted on the foundations 30 and 31 of the two bending apparatus 28 and 29. The gripping and transfer means 26 and 27 are respectively movable to a limited extend on guides 32 and 33 extending parallel to the advancing direction of the pipe strand 11. Each of the gripping and transfer means 26 and 27 comprises a pair of tiltable arms 34 provided at the free ends thereof with plier shaped grippers 35, which are movable by non-illustrated hydraulically operated piston-and-cylinder units of known construction between an open position, shown at the left side of FIG. 2 and a closed position shown at the right side of this Figure.

FIG. 1 shows an inner mandrel 36 pushed into the pipe section 19 which is inserted into the bending apparatus 28. The inner mandrel 36 is movable in axial direction and can be moved out from the bending apparatus 28 in rearward direction, as indicated by the arrow on the mandrel. For this purpose there is provided a hydraulically actuatable mandrel loosening cylinder and piston unit 37 with a short stroke, which after bending of the pipe section 19 to an exhaust pipe 38, (as shown at the bending apparatus 29) first loosens the inner mandrel 36, the front portion thereof sticks to the bent pipe. Subsequently thereto, the thus loosened inner mandrel 36 is rearwardly pulled out of the pipe at high speed by an elongated pneumatically operated cylinder and piston unit 39.

The pipe sections 19 in the bending apparatus 28 and 29 are held at the region of the rear end thereof by means of clamping collets 40 of known construction. The clamping collets 40 are respectively mounted on a slide 41 constructed as described in further detail in the copending application Ser. No. 126,833, now U.S. Pat. No. 4,331,016, to permit an axial movement, as well as a turning of the pipe section 19.

Figure 3:
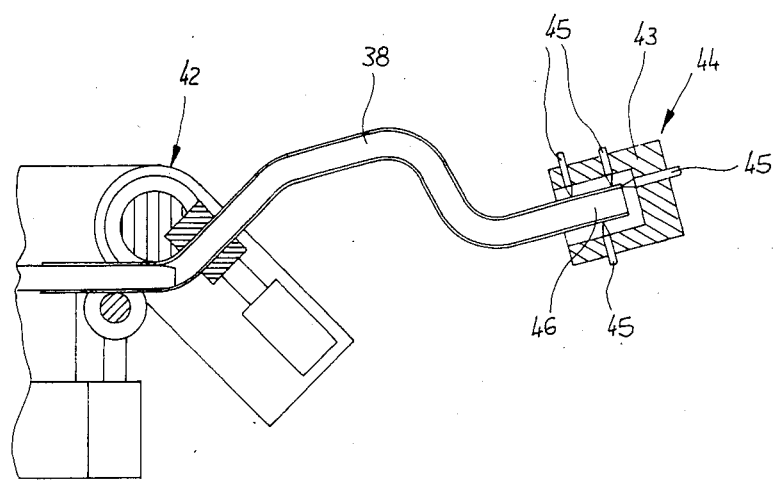
FIG. 3 is a schematic, partly sectioned view of the bending head of a bending apparatus together with a gauging head, drawn to a larger scale than FIGS. 1 and 2.

After the bending operation is finished, the exhaust pipe 38 (see also FIG. 3) is held in the last bending position in the bending head 42 of the respective bending apparatus, for instance the apparatus 29. The bending head 42 is of conventional construction and is also described in further detail in the aforementioned copending application. Subsequently thereto, a gauging head 43 of a control station 44, in which the gauging head 43 is provided with a plurality of feelers 45, is moved onto the end 46 of the exhaust pipe 38. Since eventual bending errors become perceptible especially at the end 46 of the exhaust pipe 38, it is sufficient to check only the pipe end 46. If the gauging of the end 46 shows that the dimensions of this end are within the predetermined tolerances, the respective bending apparatus receives a signal which opens in a known manner the collet 40 to free the finished bent exhaust pipe, which is then transferred to a delivery station.

Figure 4:
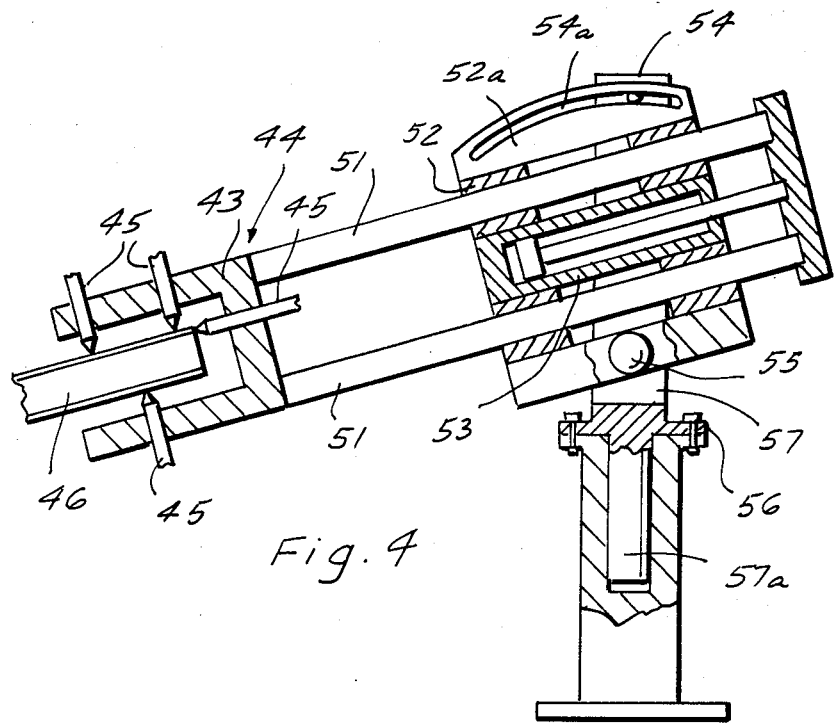
FIG. 4 schematically illustrates, partly in section, the mounting of the bending head.

FIG. 4 illustrates the mounting of the gauging head 43 for the movement thereof onto the end 46 of a finished bent exhaust pipe. As shown in FIG. 4, the gauging head is mounted on a pair of guide rods 51 which are guided for movement in longitudinal direction in guide bushings 52 arranged in a member 52a. The guide rods 51 are movable in axial direction by a cylinder-and-piston unit 53 mounted in the member 52a between the bushings 52. The member 52a is mounted on an upright 57, tiltable about a horizontally extending axis 55 and may be secured in any tilted position by clamping means 54, schematically shown in FIG. 4 on the upright 57 and engaging into a slot 54a formed in the member 52a concentric with the tilting axis 55. The upright 57 has a downwardly extending cylindrical extension 57a turnably arranged in a corresponding vertically extending bore of a column 57b. The upright 57 may be held in any turned position by arresting means 56 of known construction and only schematically indicated in FIG. 4.

Figure 5:
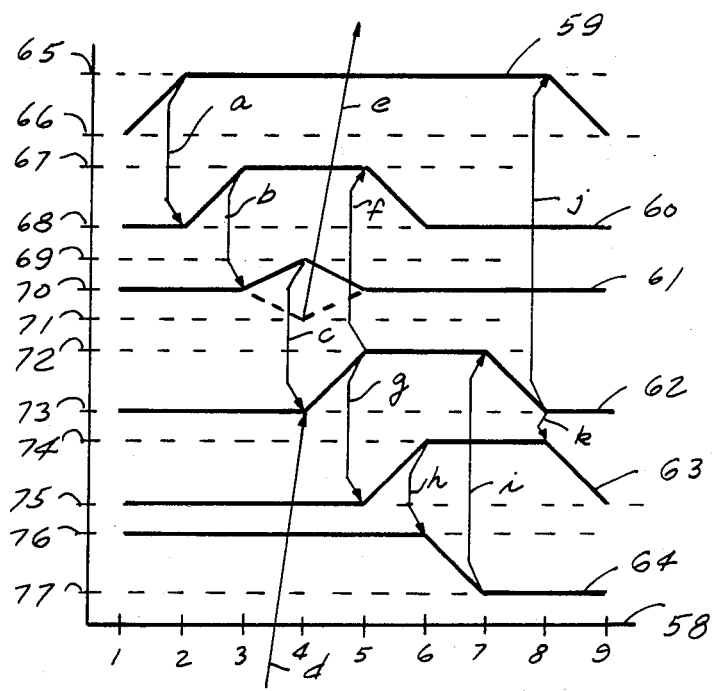
FIG. 5 is a step and displacement diagram illustrating the sequence of steps produced by the various elements of the overall apparatus.

FIG. 5 illustrates a step diagram for the operating sequence of the last bending operation performed on a tube section and the subsequent gauging operation and further transport. In this diagram the full line curve 59 illustrates the movement of the bending head 42, the full line curve 60 illustrates the movement of the piston-and-cylinder unit 53 for moving the gauging head 43 in axial direction, the full line curve 61 indicates the measuring result obtained by the feelers 45 in the gauging head 43, the full line curve 62 illustrates the movement of the arms 34 of the gripping and transfer means 26 or 27, the full line 63 indicates the movement of the grippers 35 on the arms 34, and the full line 64 illustrates the movement of the collet 40. The various successive steps 1–9 are indicated on the horizontal line 58 and the positions of the various above-mentioned members are indicated on the vertical line of the diagram. The dotted line 65 indicates the forward or bending position of the respective bending head 42, the dotted line 66 indicates the rest position of the bending head, the dotted line 67 indicates the forward position of the gauging head 43, the dotted line 68 the withdrawn position thereof, the dotted line 69 indicates an OK signal of the feelers 45 in the gauging head 43, the dotted line 70 indicates that the gauging head is inactive, whereas the dotted line 71 indicates if the feelers 45 signal that the dimensions checked by the feelers 45 are outside the predetermined tolerances, the dotted line 72 indicates the forward position of the gripper arms 34 and the dotted line 73 the return position thereof, the dotted line 74 indicating the closed position of the grippers 35 and the dotted line 75 the open position thereof, the dotted line 76 indicates the closed position of the collet 44 and the dotted line 77 the open position thereof.

At step 1 the bending head is in its inactive or rest position as shown in the bending apparatus 28 in FIG. 1, the gauging head 43 is rearwardly withdrawn from the position shown in FIG. 4 by the cylinder-and-piston unit 53, the feeler 45 on the gauging head are therefore inactive, the gripper arms 34 are in the position as shown for the gripper and transfer unit 26 in FIG. 1, that is the grippers 35 thereon are adjacent the bending head and in open position, and the collet 40 is closed to hold the rear end of the tube section inserted in the bending head. When the respective bending head 42 has moved to its bending position, as indicated at step 2, an electric signal is produced in a known manner, as indicated by the arrow a, which is transferred to a solenoid operated valve, not shown in the drawing, cooperating with the cylinder-and-piston unit 53 causing the latter to move to its advanced position, as shown in FIG. 4, and when the gauging head 43 reaches its advanced position at step 3, an electric signal, as indicated by the arrow b, is produced, actuating the feelers 45 in the gauging head. If the feelers indicate that the dimensions at the end portion 46 of the finished bent exhaust pipe 38 are within the predetermined tolerances, an electric signal, as indicated by the arrow c, is produced, which is transferred to the non-illustrated operating mechanism for the arms 34 of the gripper and transfer means which moves therefore from its rearward to its forward position. When the gripper arms 34 reach their forward position adjacent to the magazine, as indicated at step 4, two electric signals are produced indicated by the arrows f and g. The electric signal indicated by the arrow f is transferred to the valve cooperating with the cylinder-and-piston unit 53 so that the latter moves from its forward position, as indicated in FIG. 4, to a rearwardly withdrawn position and the electric signal indicated by the arrow g is transferred to the grippers 35 on the arms 34 so that the latter move from the open to the closed position gripping a tube in the magazine. When the grippers reach the closed position, as indicated at step 6, an electric signal, as indicated by the arrow h is produced, which is transferred to the operating mechanism for the collet 40 moving the same from the closed to the open position so that the finish bent and gauged tube may be withdrawn. When the collet 40 reaches its open position, as indicated at step 7, an electric signal indicated by the arrow i is produced, which is transferred to the operating mechanism of the gripper arms 34 to move the latter from the forward to the rear position. When the arms 34 reach their rear position, as indicated at step 8, two electric signals indicated by the arrows j and k are produced. The electric signal indicated by the arrow j is transferred to the operating mechanism for the bending head 42 to move the latter back to its starting position, whereas the signal indicated by the arrow k is transferred to the grippers 35 to move the latter from the closed to the open position to thus place a new tube in the bending head. At step 9 all of the elements are therefore again in the positions as indicated at step 1. Of course the mandrel 36 has to be withdrawn before the finished tube can be removed, and while the movement of the mandrel is not shown in the diagram of FIG. 5, its withdrawal could be initiated by the signal indicated by the arrow h.

If, however, at step 4 the feelers 45 indicate that the dimensions of the end portion 46 of the exhaust pipe are not within the predetermined tolerances, as indicated at the dotted portion of the measuring curve 61, an outgoing electric signal, as indicated by the arrow e, is produced which is transferred to the operating mechanism of the bending head 42 to block the latter. The welding apparatus 10 and the severing apparatus 14 may continue to work to fill the intermediate magazines 24 and 25 and the apparatus 9 and 14 may then be manually switched off if the magazines are filled. Continuation of the operation following step 4 can then be produced only by an outside, operator controlled signal as indicated by the arrow d. The electric signals may be produced by limited switches contacted by the respective components or by other sensors, such as electric eyes or the like.

It will be understood that each of the elements described above, or two or more together, may also find a useful application in other types of apparatus for the continuous production of exhaust pipes differing from the types described above.

While the invention has been illustrated and described as embodied in an apparatus for the continuous production of exhaust pipes it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for the continuous production of exhaust pipes for automotive vehicles comprising the steps of bending and welding a continuous metal strip to an endless pipe strand while continuously moving the strand in axial direction with a predetermined speed; straightening the strand; stepwise severing said pipe strand into pipe sections of predetermined length while the strand continuously moves at said predetermined speed; and thereafter alternatingly transferring the cut pipe sections into two bending apparatus for bending the pipe sections into exhaust pipes with predetermined bends, and wherein the two bending apparatus are respectively located to opposite sides of a path along which the cut pipe sections are moved, bending said pipe sections into predetermined bends having exhaust pipe configurations; and further including the step of gauging one end of the bent pipe section while still held by the bending apparatus by moving a gauging head provided with feeler means over said one end to indicate that the pipe dimensions are within predetermined tolerances.

2. In an apparatus for the continuous production of exhaust pipes for automotive vehicles, a combination, comprising means for continuously moving an elongated metal strip with a predetermined speed along a predetermined path extending in the longitudinal direction of the strip; forming and welding means along said path for continuously forming and welding said strip during the movement thereof with said predetermined speed, depending on the maximum obtainable welding speed, into a continuous pipe strand; severing means downstream of said forming and welding means for cutting said pipe strand into sections of predetermined length during continuous advance of said pipe strand; two bending means including an elongated mandrel for bending the successively produced pipe sections into exhaust pipes, said two bending means being arranged to opposite sides of said path and including transfer means for alternatingly transferring successive pipe sections respectively to the two bending means; control means coordinated with the bending means for gauging the dimensions at the free end of a finished tube section while the latter is still held by said bending means, said control means including a gauging head provided with a plurality of feelers adjusted to the desired dimension at the end of the bent tube section, means for moving said gauging head between a first position in which said gauging head receives said end of said bent tube section and a second position distant from said end, guide means for guiding said moving means along a rectilinear path, and means for adjusting the position of the guide means about two axes normal to each other and for arresting said guide means in any adjusted position.

3. A combination as defined in claim 2, wherein said control means are coordinated with said welding means, said severing means and said bending means in such a manner to stop at least said bending means when said feelers indicate a dimension on said end of said bent tube section which deviates from the desired dimension.

4. In an apparatus for the continuous production of exhaust pipes for automotive vehicles, a combination, comprising means for continuously moving an elongated metal strip with a predetermined speed along a predetermined path extending in the longitudinal direction of the strip; forming and welding means along said path for continuously forming and welding said strip during the movement thereof with said predetermined speed, depending on the maximum obtainable welding speed, into a continuous pipe strand; severing means downstream of said forming and welding means for cutting said pipe strand into sections of predetermined length during continuous advance of said pipe strand; and two bending means including an elongated mandrel for bending the successively produced pipe sections into exhaust pipes, said two bending means being arranged to opposite sides of said path and including a transfer means for alternatingly transferring successive pipe sections respectively to the two bending means; conveying means having a longitudinal axis extending in the direction of said path and being arranged between said severing means and said bending means, and at least one magazine for severed tube sections located laterally of said conveyor means, said conveyor means being tiltable about said longitudinal axis and including means for tilting said conveyor means about said longitudinal axis for transferring tube sections on said conveyor means to said magazine; gripping and transfer means between said magazine and said bending means for transferring tube sections in said magazine from the latter to said bending means, said gripping and transfer means comprising a pair of parallel arms each mounted on one end tiltable about an axis parallel to said longitudinal axis and carrying the other end gripper means movable between an open and a closed position.

* * * * *